Sept. 4, 1928.  T. GYTHFELDT  1,682,784
DENTAL DRILLING APPARATUS
Filed Nov. 3, 1923
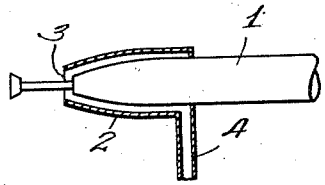
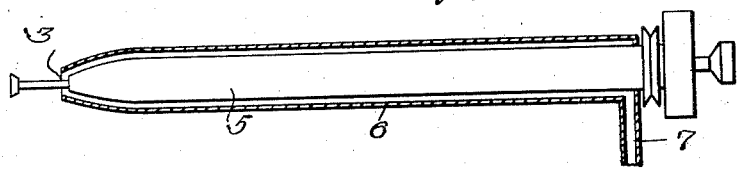
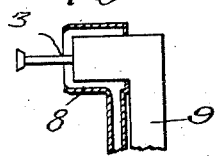 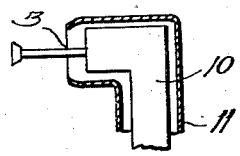
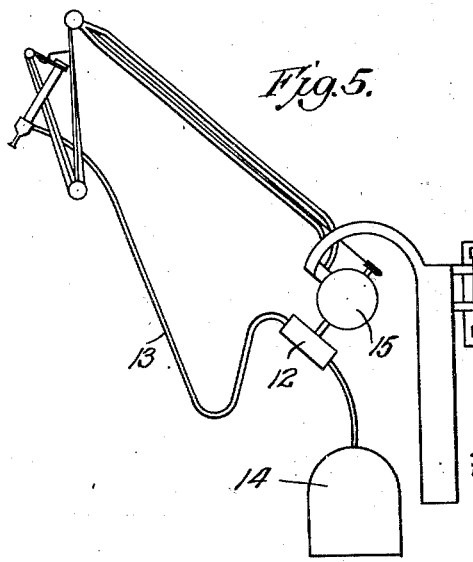
Inventor:
Trygve Gythfeldt Patented Sept. 4, 1928.

1,682,784

UNITED STATES PATENT OFFICE.

TRYGVE GYTHFELDT, OF STJORDALEN, NORWAY.

DENTAL DRILLING APPARATUS.

Application filed November 3, 1923, Serial No. 672,667, and in Norway February 20, 1923.

This invention relates to improvements in dental drilling apparatus, and it has for its object improvements by which certain advantages shall be obtained. More particularly it has for its object to provide means for automatically removing the dust and particles produced by the drilling operation. Previously it has been usual to remove this material by blowing air into the cavity.

According to the present invention, in dental drilling apparatus means are provided to remove the dust and particles produced by the drilling operation comprising a chamber mounted on the drill chuck with an opening directed towards the drill, and suction apparatus connected to said chamber.

Preferably the chamber surrounds the drill chuck, and the drill extends through the opening in the chamber.

Apparatus according to the present invention will now be described with reference to the accompanying drawings wherein:—

Figure 1 shows a drill chuck with the chamber mounted thereon,

Figure 2 shows a slightly modified form,

Figure 3 a further modified form,

Figure 4 a further modified form, and

Figure 5 a dental drilling machine with the extraction apparatus mounted thereon.

Referring to Figure 1. 1 is the drill chuck, on which is mounted a chamber or hood 2 so as to surround the end of the chuck, and with an opening 3 at the front, through which the drill extends. 4 is a tube connecting the chamber 2 with the suction apparatus.

In Figure 2 the chamber 6 completely surrounds the drill chuck 5, and 7 indicates the tube connected to the suction apparatus.

In Figure 3 the chamber 8 is exactly of the form illustrated in Figure 1, but the drill chuck 9 is of right-angled form. In Figure 4 the chamber 11 is of right-angled form similar to the drill chuck 10.

Referring to Figure 5. 1 is the drill chuck, and 2 the chamber surrounding it at its end, the said chamber being connected by a tube 13 to a suction pump 12 which is mounted on the spindle of the driving motor 15. The pump is also connected to a collecting vessel 14 for the dust.

It will be understood that, if desired, the suction pump may be independent of the dental machine, in which case separate driving means therefor must be provided.

Apparatus according to the present invention is clean and sanitary, and by its use a saving of time is obtained, by rendering it unnecessary to interrupt periodically the drilling operation to blow out the dust and particles produced.

Having now particularly described and ascertained the nature of my said invention, and in what manner the same is to be performed, I declare that what I claim is:—

1. In combination, a drill mounted for rotation, a shell concentric with said drill and spaced therefrom, said shell having a concentric aperture in its end, said drill extending through said aperture and means on said shell for attaching vacuum producing means, whereby cuttings from the drill will be sucked into the aperture and removed through the shell.

2. In combination, a rotatable drill, a shell spaced therefrom coaxial therewith and surrounding the same, said drill projecting axially through said shell and means on said shell for attaching vacuum producing means, whereby cuttings from the drill will be sucked into the aperture and removed through the shell.

3. In combination, a rotatable drill, a shell coaxial therewith and surrounding the same, said drill projecting through the shell, the wall of the shell defining the aperture therein through which the drill projects, being spaced from the periphery of the drill stem and means on said shell for attaching vacuum producing means, whereby cuttings from the drill will be sucked into the aperture and removed through the shell.

In testimony whereof, I affix my signature.

TRYGVE GYTHFELDT.